United States Patent
Hoover et al.

(10) Patent No.: US 11,459,109 B2
(45) Date of Patent: Oct. 4, 2022

(54) AUTOMATIC AIRCRAFT PILOT SEAT SIDE-STICK ARMREST

(71) Applicant: AMI Industries, Inc., Colorado Springs, CO (US)

(72) Inventors: Douglas E. Hoover, Colorado Springs, CO (US); Keith M. Ferguson, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/186,090

(22) Filed: Feb. 26, 2021

(65) Prior Publication Data

US 2021/0269161 A1 Sep. 2, 2021

Related U.S. Application Data

(60) Provisional application No. 62/982,417, filed on Feb. 27, 2020.

(51) Int. Cl.
*B64D 11/06* (2006.01)
(52) U.S. Cl.
CPC ...... *B64D 11/0644* (2014.12); *B64D 11/0689* (2013.01)
(58) Field of Classification Search
CPC .................. B64D 11/0644; B64D 11/0689
See application file for complete search history.

(56) References Cited

U.S. PATENT DOCUMENTS

| 8,333,432 B2 | 12/2012 | Cone |
| 2011/0049960 A1 | 3/2011 | Ferguson et al. |
| 2019/0092195 A1 | 3/2019 | Davis et al. |

FOREIGN PATENT DOCUMENTS

| DE | 102005006977 A1 | 8/2006 | |
| DE | 102007024000 A1 * | 11/2008 | ............. B60N 2/767 |

OTHER PUBLICATIONS

Extended Search Report for European Application No. 21160040.8 dated Jul. 12, 2021, 8 pages.

* cited by examiner

*Primary Examiner* — Anthony D Barfield
(74) *Attorney, Agent, or Firm* — Suiter Swantz pc llo

(57) ABSTRACT

An armrest is disclosed that includes an armrest frame rotationally coupled to a seat frame, an armrest subframe pivotably couple to a second end of the armrest frame, and an arm pad laterally aligned and translatably coupled to the armrest subframe. The armrest further includes a tilting mechanism configured to pivot the armrest subframe relative to the armrest frame. The armrest further includes a translation mechanism configured to translate the arm pad relative to the armrest subframe. The armrest further includes a rotation mechanism configured to rotate the armrest relative to the seat frame. At least one of the tilting mechanism, the translation mechanism, or the rotation mechanism includes a spring-loaded linkage.

13 Claims, 7 Drawing Sheets

AUTOMATIC AIRCRAFT PILOT SEAT SIDE-STICK ARMREST

PRIORITY

The present application claims the benefit under 35 U.S.C. § 119(e) of U.S. Provisional App. No. 62/982,417 (filed Feb. 27, 2020), which is incorporated herein by reference.

BACKGROUND

A side-stick, or sidestick controller, is an aircraft control joystick located on a side console in a cockpit that is typically configured to control one or more aspects of the control of the aircraft. Pilot seats often have armrest adjustment capability to allow the pilot to comfortably and accurately make adjustments to the side-stick. It is often difficult to adjust the movements on the existing pilot seat side-stick armrests. Adjustment of existing pilot seat side-stick armrests usually requires spinning knobs multiple times to achieve the proper armrest orientation necessary for the pilot to have their arm positioned correctly to the aircraft side-stick mounted to the cock-pit console. The adjustment process is complicated enough for some side-stick armrests to have dial indicators to help the pilot achieve their optimum arm to side-stick position. Therefore, it would be advantageous to provide a solution that cures the shortcomings described above.

SUMMARY

An armrest is disclosed. In one or more embodiments, the armrest includes an armrest frame rotationally coupled at a first end to a seat frame. In one or more embodiments, the armrest further includes an armrest subframe pivotably coupled to a second end of the armrest frame. In one or more embodiments, the armrest further includes an arm pad laterally aligned and translatably coupled to the armrest subframe. In one or more embodiments, the arm pad includes a structure layer. In one or more embodiments, the structure layer includes a well. In one or more embodiments, the armrest includes a tilting mechanism configured to pivot the armrest subframe relative to the armrest frame. In one or more embodiments, the tilting mechanism includes a first moveable member pivotally coupled to the armrest subframe. In one or more embodiments, the armrest subframe further includes a second moveable member pivotally coupled to the armrest frame and mechanically coupled to the first moveable member. In one or more embodiments, the tilting mechanism further includes a pushrod coupled to at least one of the first moveable member or the second moveable member at a pivot end, and at least one of the armrest frame or armrest subframe, wherein an extension of the pushrod increases the tilt of the armrest subframe relative to the armrest frame. In one or more embodiments, the armrest includes a tilt mechanism spring mechanically coupled to at least one of the first moveable member, the second moveable member, or the pushrod and configured to bias the pushrod towards the extension. In one or more embodiments, the armrest includes a translation mechanism configured to translate the arm pad relative to the armrest subframe. In one or more embodiments, the translation mechanism includes a rail lock actuator coupled to the armrest frame and configured to releasably interact with the rail. In one or more embodiments, the armrest includes a rotation mechanism coupled to the seat frame and the armrest, and configured to rotate the armrest relative to the seat frame. In one or more embodiments, the rotation mechanism includes a spring-loaded linkage.

In some embodiments of the armrest, wherein the pushrod is configured to releasably lock at more than one position of extension.

In some embodiments of the armrest, the tilting mechanism is configured to lock the armrest subframe into a plurality of tilting positions relative to the armrest frame.

In some embodiments of the armrest, the tilting mechanism further includes a tilt input actuator configured to at least one of lock the armrest subframe into or release the armrest from the plurality of tilting positions.

In some embodiments of the armrest, the armrest is configured to manually pivot relative to the armrest frame.

In some embodiments of the armrest, rail lock actuator is configured as a friction lock.

In some embodiments of the armrest, the rail lock actuator is configured to lock the arm pad into a plurality of translation positions relative to the armrest subframe.

In some embodiments of the armrest, the armrest of claim 1, wherein the arm pad is configured to translate manually relative to the armrest subframe.

In some embodiments of the armrest, the rotation mechanism is configured to releasably lock into a plurality of rotation positions relative to the seat frame.

In some embodiments of the armrest, the rotation mechanism further includes a rotation input actuator configured to at least one of lock the armrest subframe into or release the armrest from the plurality of rotation positions.

In some embodiments, the armrest is configured to be manually pivoted relative to the armrest frame, A method is also disclosed. In one or more embodiments, the method includes actuating a rotation input actuator, wherein actuating the rotation input actuator releases a rotation mechanism from a locked rotation position, wherein a release of the rotation mechanism rotationally biases an armrest frame relative to a seat frame, wherein the armrest frame and the seat frame are rotationally coupled. In one or more embodiments, the method further includes actuating a tilt input actuator, wherein actuating the tilt input actuator releases a tilting mechanism from a locked tilted position, wherein a release of the tilting mechanism pivotably biases an armrest subframe relative to the armrest frame, wherein the armrest subframe and the armrest frame are pivotably coupled. In one or more embodiments, the method further includes actuating a rail lock actuator, wherein actuating the rail lock actuator releases an arm pad from a locked position relative to the armrest subframe, wherein the arm pad is laterally aligned and translatably coupled to the armrest subframe.

In some embodiments of the method, the method further includes manually rotating the armrest frame relative to the seat frame and deactivating the rotation input actuator.

In some embodiments of the method, the method further includes manually pivoting the armrest subframe relative to the armrest frame and deactivating the tilt input actuator.

In some embodiments of the method, the method further includes manually translating the arm pad relative to the armrest subframe, and deactivating the rail lock actuator.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
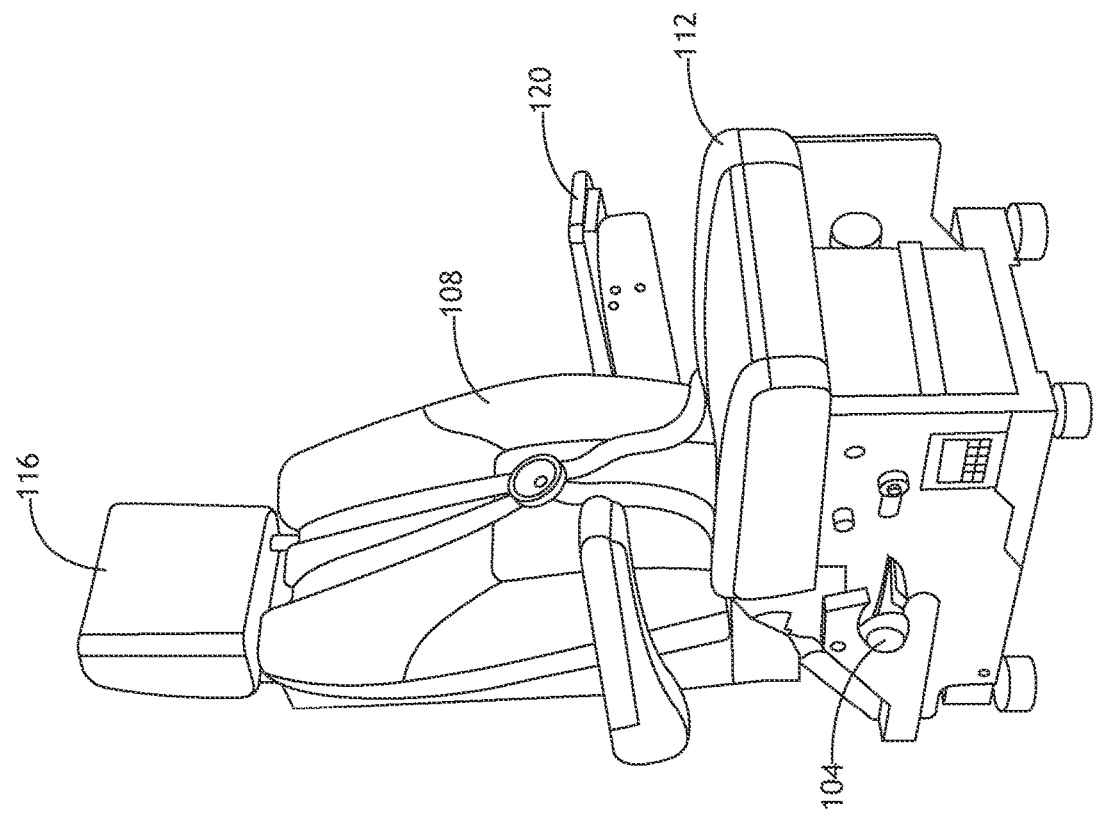
FIG. 1 is an illustration of an example environment of an aircraft seat, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An armrest for a seat is disclosed. Specifically, an armrest for a pilot seat of a cockpit is disclosed. More particularly, the armrest is capable of pivoting, extending. Retracting, and raising/lowering relative to the passenger seat via three separate adjustment mechanism. These adjustment mechanisms are configured to give pilots greater comfort and control when operating an aircraft, particularly when operating a side-stick.

FIG. 1 is an example environment of an aircraft seat 100, in accordance with one or more embodiments of the present disclosure. The aircraft seat 100 includes a seat frame 104, a seat back 108, a seat pan 112, a headrest 116. The aircraft seat also includes at least one armrest 120 having multiple adjustment capabilities as described herein.

Figure 2:
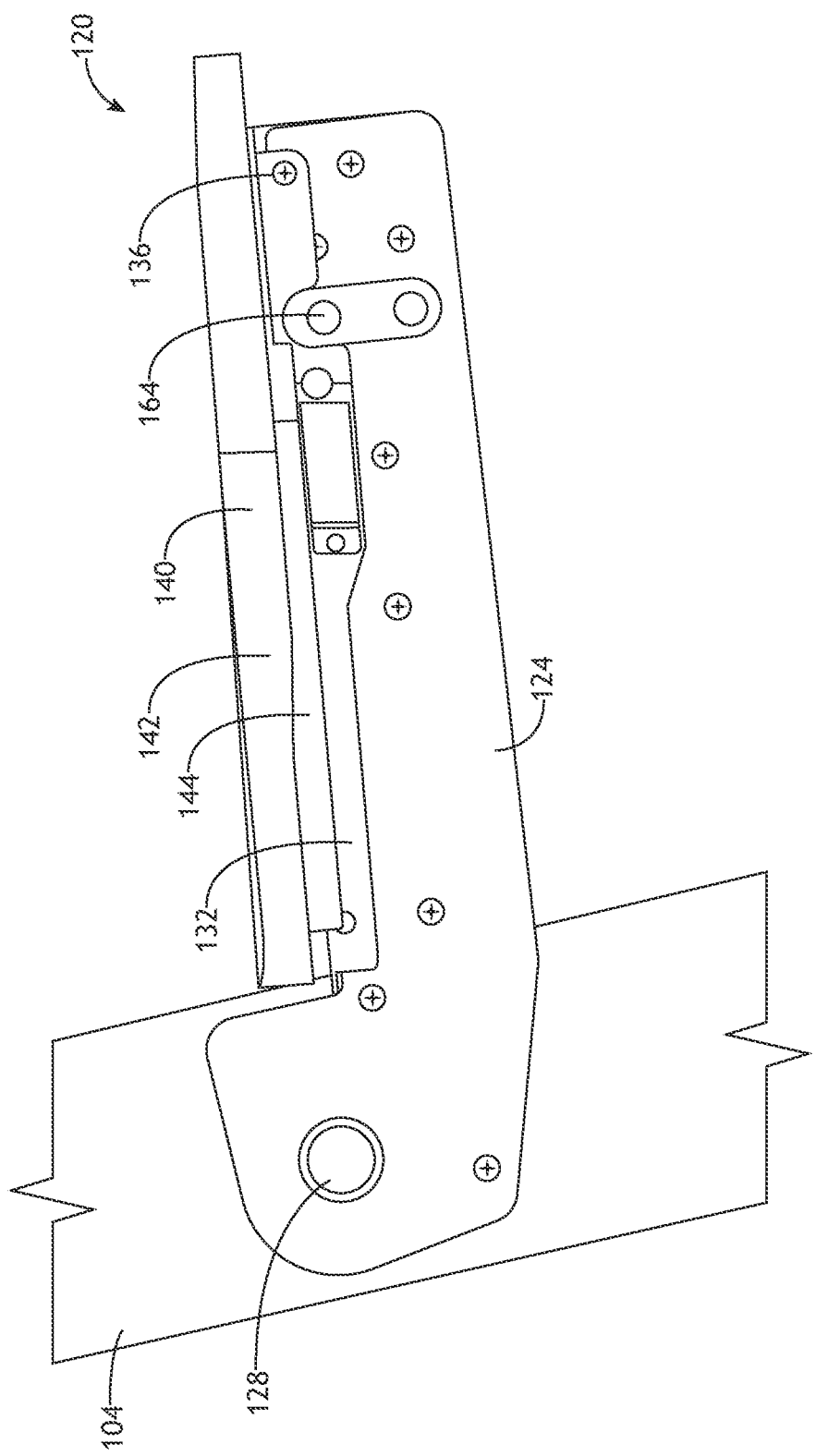
FIG. 2 is an illustration of a side view of an armrest attached to the seat frame, in accordance with one or more embodiments of the disclosure.

FIG. 2 is a side view of the armrest 120 attached to the seat frame 104, in accordance with one or more embodiments of the disclosure. In some embodiments, the armrest 120 includes an armrest frame 124. The armrest frame 124 pivotably couples at a first end to the seat frame 104. The armrest frame 124 also attaches to other components of the armrest 120. The armrest 120 further includes an armrest joint 128 for rotationally coupling to the seat frame 104. The armrest joint 128 is configured to allow the armrest to pivot relative to the seat frame 104 when the armrest 120 is attached to the seat frame 104.

In some embodiments, the armrest 120 further includes an armrest subframe 132 coupled to the armrest frame 124 at a pivot point 136. For example, the armrest is configured pivotably coupled to the armrest frame via the pivot point 136 (e.g., the pivot point allows the armrest subframe 132 to tilt relative to the armrest frame 124.

Figure 4:
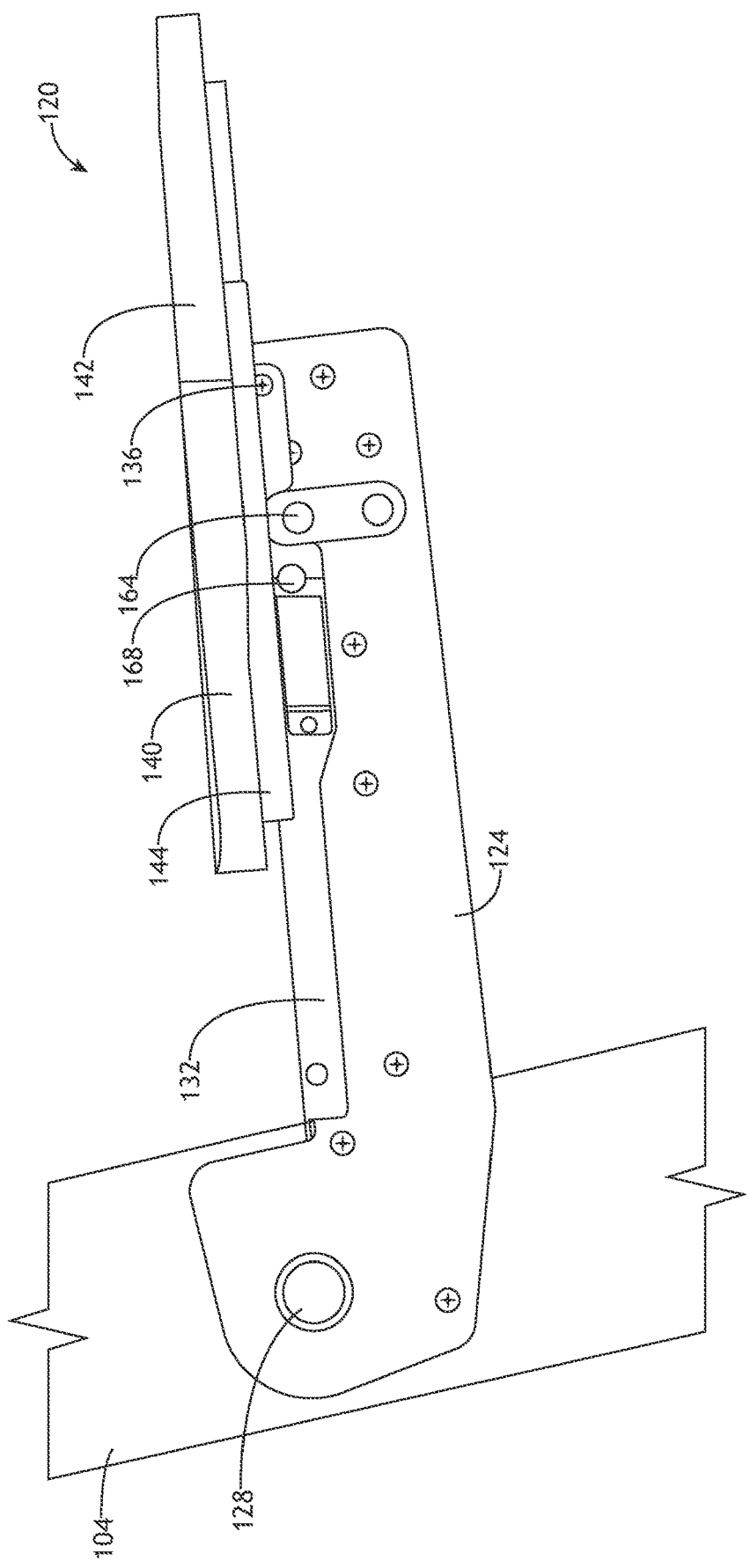
FIG. 4 is an illustration of a side view of the armrest attached to the seat frame with an arm pad in a translated position, in accordance with one or more embodiments of the disclosure.

In some embodiments, the armrest 120 includes am arm pad 140 disposed upon the armrest subframe 132. The arm pad 120 may be of any type or size of support structure for the arm and may consist of one or more layers (e.g., a comfort layer 142 and/or a structure layer 144). The arm pad 140 may be laterally aligned with and translatable coupled to the armrest subframe 132. For example, the arm pad 140, in a retracted position, may be cover the entirety of the armrest subframe 132. In another example, the arm pad 140 may be extended relative to the armrest subframe (e.g., as shown in FIG. 4).

Figure 3:
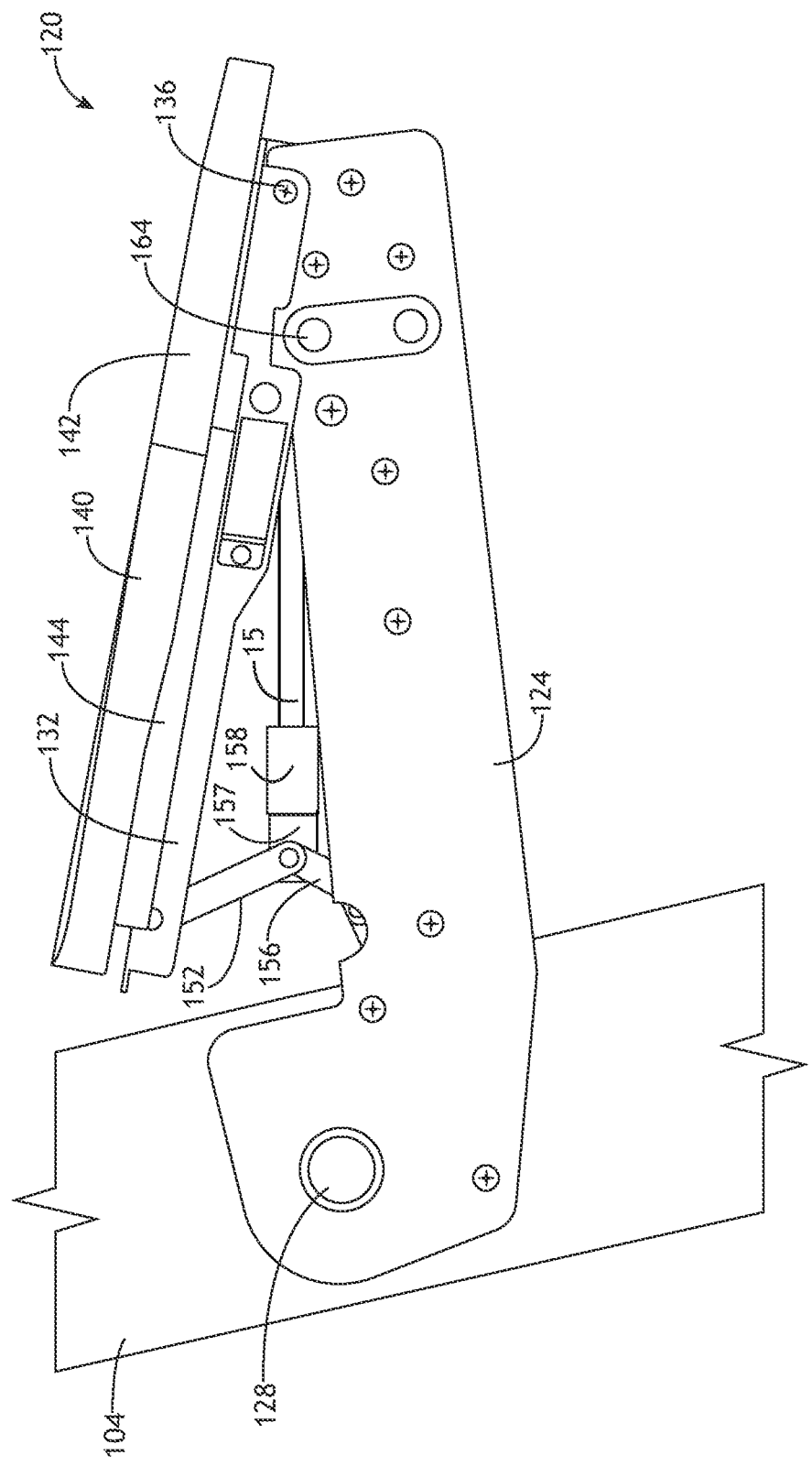
FIG. 3 is an illustration of a side view of the armrest attached to the seat frame with the armrest subframe in a tilted configuration, in accordance with one or more embodiments of the disclosure.

FIG. 3 is a side view of the armrest 120 attached to the seat frame 104 with the armrest subframe 132 in a tilted configuration, in accordance with one or more embodiments of the disclosure. In some embodiments, the armrest subframe is 132 is tilted, or pivoted, relative to the armrest frame 124 via a tilting mechanism configured to lock the armrest subframe 132 into a plurality of tilting positions relative to the armrest frame 124, allowing an infinite number of tilt angles or tilt positions between the armrest subframe 143 and the armrest frame. The titling mechanism may be configured as any type of mechanism configured to control the tilt of the armrest subframe relative to the armrest frame. For example, the armrest 120 may include a tilting mechanism based on a spring-loaded apparatus (e.g., motion of the tilting mechanism is powered via a spring).

In some embodiments, the tilting mechanism includes a first moveable member 152 pivotably coupled to one end of the armrest subframe 132 (e.g., via a simple hinge joint). For example, the first moveable member 152 may be coupled to the end of the armrest subframe opposite of the pivot point 136. The tilting mechanism may also include a second moveable member 156 pivotably coupled on one end to the armrest frame 124 or armrest frame-attached component, and pivotably coupled to the first moveable member 152 (e.g., via a hinge.) The titling mechanism may also include a pushrod 157 coupled to a collar 158, which is coupled to a shaft 159. The pushrod 157 may be coupled to the connection point of the first movable member 152 and the second moveable member 156 at the point where the both members are coupled (e.g., at the hinge joint). The movement of the pushrod 157 may actuate the first moveable member 152 and second moveable member 156, altering the tilt angle of the armrest subframe 132 relative to the armrest frame 124. For example, the shaft, having a motive force pushed against it by a spring or other biasing unit, may push upon the pushrod 157 (e.g., aided and/or aligned by the collar), resulting in an extension of the pushrod and an increased distance between the opening between the armrest subframe 132 and the armrest frame 124. In another example, a spring within the shaft (e.g., a compression spring), may apply a biasing force against the pushrod. Compression and/or extension springs may also be attached to the first moveable member 152 and/or second moveable member 146 and utilized to provide a force alter the angle of the armrest subframe 132 relative to the armrest frame 124.

In some embodiments the armrest may include a tilt input actuator 164 configured to at least one of lock the armrest subframe 132 into or release the armrest subframe 132 from one of the plurality of tilting positions. For example, the tilt input actuator 164 may have a default lock setting that prevents movement of the armrest subframe, thereby preventing any change in tilt. In another example, manual pressing of a button on the tilt input actuator 164 may release the lock setting and allow pivoting movement of the armrest subframe (e.g., via the springs). The armrest 120 may utilize any type of lock/unlock mechanism. For example, the tilt input actuator 164 may be mechanically coupled to a friction-type locking mechanism consisting of a rod coupled to the second moving member 156 and the armrest frame 124, with a coupler translatably or slidably coupled to the rod and affixed and mechanically coupled to the tilt input actuator 164. When the tilt input actuator 164 is not actuated (e.g., the button on the tilt input actuator 164 is not depressed), a locking element presses a locking portion of the coupler against the rod, holding the armrest in a tilt position. Upon pressing the button associated with the tilt input actuator 164, the locking portion is released from the rod, and the tilting of the armrest subframe may be adjusted by the biasing spring or adjusted manually by pushing on the armrest subframe 132 or arm pad 140.

As mentioned herein, the tilt mechanism is configured to adjust the armrest 120 to an unlimited number of tilt positions. For example, the tilt mechanism may be configured to adjust the armrest subframe to tilt to from any position approximately parallel to the armrest frame 104 to approximately 15° relative to the armrest frame. In another example, the tilt mechanism may be configured to adjust the armrest subframe to tilt to from any position approximately parallel to the armrest frame 104 to approximately 20° relative to the armrest frame. In another example, the tilt mechanism may be configured to adjust the armrest subframe to tilt to from any position approximately parallel to the armrest frame 104 to approximately 30° relative to the armrest frame.

FIG. 4 is a side view of the armrest 120 attached to the seat frame 104 with the arm pad 140 (e.g., the comfort layer 142 and the structure layer 144) configured in a translated, or extended, position relative to the armrest subframe 132, in accordance with one or more embodiments of the disclosure. The arm pad 140 is configured to slide along the armrest subframe 132 while still maintaining lateral alignment with the armrest subframe. The sliding of the arm pad 140 along the armrest subframe 132 may involve any sliding technology. For example, the arm pad 140 may be configured to slide along the armrest subframe 132 within a grooved channel or other surface (e.g., the arm pad 140 and armrest subframe 132 may be arranged in a tongue and groove, rail and stile, or similar arrangement). The arm pad 140 and/or armrest subframe 132 may also include one or more bearings to facilitate the sliding of the arm pad 140 along the armrest subframe 132.

In some embodiments, the armrest includes a rail lock actuator 168 configured to lock the arm pad 140 into one or more of a plurality of translation positions relative to the armrest subframe. For example, the rail lock actuator may be configured to lock the arm pad 140 into an unlimited number of translation positions. The rail lock actuator 168 may configured as any type of releasable locking mechanism. For example, the rail lock actuator 168 may be configured as a friction lock. For instance, the rail lock actuator 168 may be configured as a biasing unit coupled to the armrest subframe 132 that biases against the structure layer 144 (e.g., a rail or rail-like section of the structure layer 144) of the arm pad 140. In particular, the biasing unit may include a spring. In another instance, the pressing of a button on the rail lock actuator 168 (e.g., represented by a circle in FIG. 4), may release the biasing unit, allowing the arm pad 140 to be manually positioned in one of a plurality of translation positions (e.g., the rail lock actuator 168 is configured to releasably interact with the rail of the structure layer 144). Upon release of the button for the rail lock actuator, the arm pad 140 is locked into the translation position. In some embodiments, the arm pad 140 may be translated relative to the arm subframe 132 via a biasing member, such as a spring.

Figure 5:
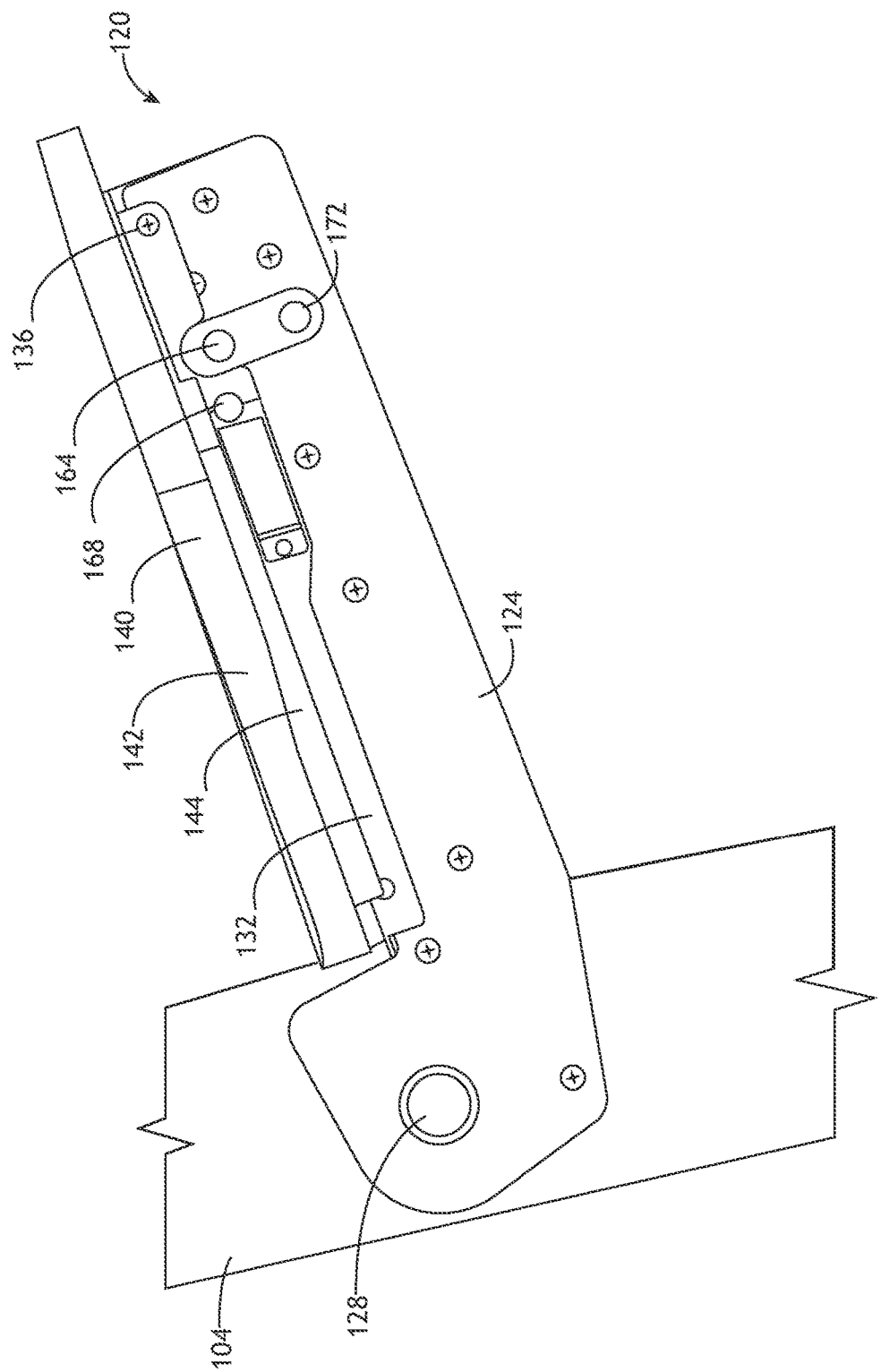
FIG. 5 is an illustration a side view of the armrest attached to the seat frame with the armrest in a pivoted position in accordance with one or more embodiments of the disclosure.

FIG. 5 is an illustration a side view of the armrest attached to the seat frame 104 with the armrest 120 in a pivoted position (e.g., upward tilted position) relative to the seat frame 104 in accordance with one or more embodiments of the disclosure. The armrest 120 may be configured to rotate with any degree of freedom. For example, the armrest 120 may be configured to rotate 360° relative to the seat frame 104 (e.g., the armrest 120 may be configured to rotate in a complete circle). In another example, the armrest 120 may be configured to rotate 90° relative to the seat frame 104. For instance, the armrest 120 may be configured to rotate 45° clockwise and counter clockwise from an initial position relative to the seat frame 104 when the armrest 120 at the initial position is positioned parallel to a floor that the seat frame 104 sits upon. In another example, the armrest 120 may be configured to rotate 30° relative to the seat frame 104. In another example, the armrest 120 may be configured to rotate 15° relative to the seat frame 104.

In some embodiments, the armrest is configured with a rotation mechanism coupled to the seat frame 104 and the armrest 120, and configured to rotate the armrest 120 (e.g., armrest frame 124) relative to the seat frame 104. The rotation mechanism may be configured with a biasing mechanism that biases the armrest 120 towards a rotation position. For instance, the rotation mechanism may include a spring-loaded linkage. Any type of spring-loaded linkage may be utilized by the rotation mechanism. For example, the spring-loaded linkage may include a rotational spring associated with the armrest joint 128 configured to bias the armrest 120 towards a raised position relative to the seat frame 104. In another example, the spring-loaded linkage may include one or more extension springs coupled to the armrest 120 and the seat frame 104.

In some embodiments, the rotation mechanism further includes a rotation input activator 172 coupled to the armrest frame 124 configured to lock the armrest frame 124 into one of a plurality of rotation positions and/or release the armrest frame 124 from one of the plurality of rotation positions. For example, the rotation input actuator 172 may have a default lock setting that prevents movement of the armrest subframe, thereby preventing any change in rotation. In another example, manual pressing of a button on the rotation input actuator 172 (e.g., shown as a circle in FIG. 5) may release the lock setting and allow rotation of the armrest frame 124 (e.g., via the one or more springs). The armrest 120 may utilize any type of lock/unlock mechanism. For example, the rotation input actuator 172 may be mechanically coupled to a friction-type locking mechanism consisting of a rod coupled to the seat frame 104 and/or armrest joint 128 and the armrest frame 124, with a coupler translatably or slidably coupled to the rod and affixed and mechanically coupled to the rotation input actuator 172. When the rotation input actuator 164 is not actuated (e.g., the button on the rotation input actuator is not depressed), a locking element presses a locking portion of the coupler against the rod, holding the armrest 120 in a single rotation position. Upon pressing the button associated with the rotation input actuator 172, the locking portion is released from the rod, and the tilting of the armrest frame 124 may be adjusted by the biasing spring or adjusted manually by pushing on the armrest subframe 132 or arm pad 140.

Figure 6:
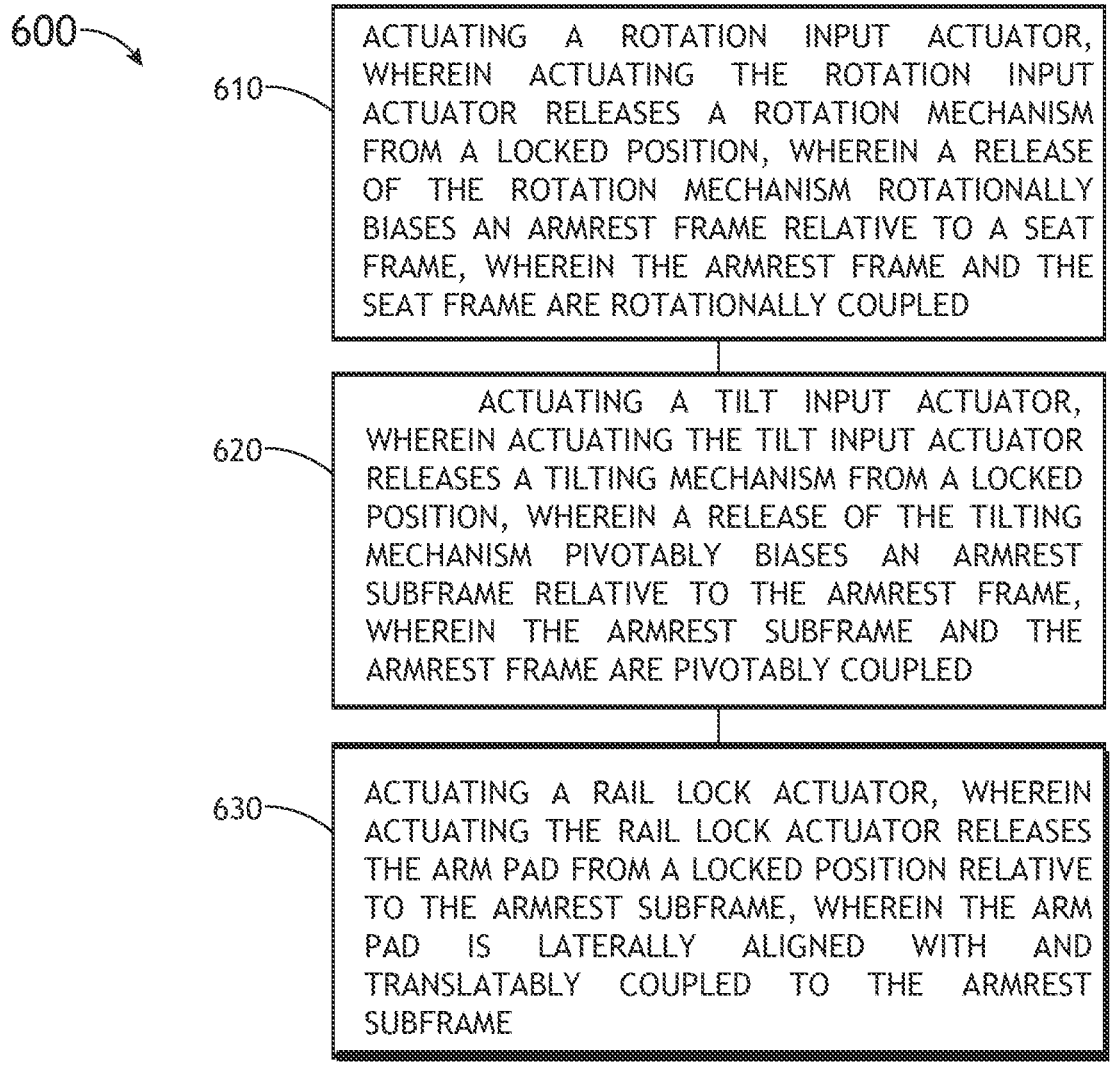
FIG. 6 is a flowchart illustrating a method 600 for adjusting the armrest 120, in accordance with one or more embodiments of the disclosure.
Figure 6:
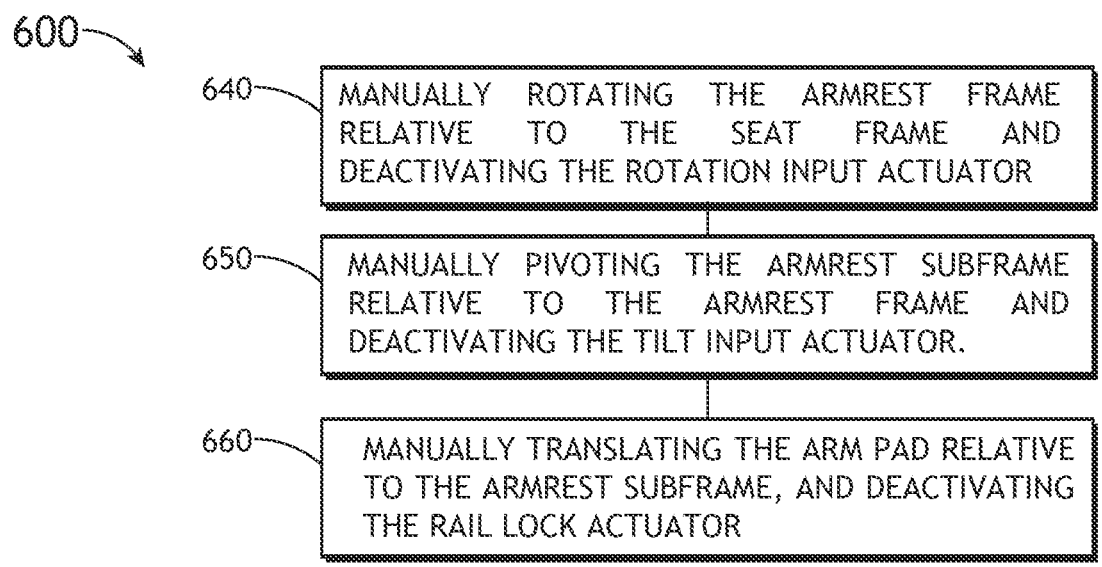

FIG. 6 is a flowchart illustrating a method 600 for adjusting the armrest 120, in accordance with one or more embodiments of the disclosure. The method 600 includes one or more steps for adjusting the rotation of the armrest frame 124 relative to the seat frame 104, the tilting or pivoting of the armrest subframe 132 relative to the armrest frame 124, and the translation (e.g., extension and/or retraction) of the arm pad 140 relative to the armrest subframe 132.

In some embodiments, the method 600 includes a step 610 of actuating the rotation input actuator 172, wherein actuating the rotation input actuator 172 releases a rotation mechanism from a locked rotation position, wherein a release of the rotation mechanism rotationally biases the armrest frame 124 relative to the seat frame 104, wherein the armrest frame 124 and the seat frame 104 are rotationally coupled. For example, a user may push a button associated with the rotation input actuator 172, releasing the armrest frame 124 from a locked position of rotation, and allowing a biasing spring within the rotation mechanism to rotate the armrest frame 124 to a different rotation position relative to the seat frame 104. The rotation input actuator 172 may be configured such that deactivating the rotation input actuator 172 (e.g., by releasing the button associated with the rotation input actuator 172) relocks the rotation mechanism.

In some embodiments, the method 600 includes a step 620 of actuating the tilt input actuator 164, wherein actuating the tilt input actuator 164 releases a tilting mechanism from a locked tilt position, wherein a release of the tilting mechanism pivotably biases an armrest subframe 132 relative to the armrest frame 124, wherein the armrest subframe 132 and the armrest frame 124 are pivotably coupled. For example, a user may push a button associated with the tilt input actuator 164, releasing the armrest subframe 132 from a locked tilt position, and allowing a biasing spring within the tilting mechanism to pivot the armrest subframe 132 to a different tilt position relative to the armrest frame 124. The tilt input actuator 164 may be configured such that deactivating the tilt input actuator 164 (e.g., by releasing the button associated with the tilt input actuator 164) relocks the tilting mechanism.

In some embodiments, the method includes a step 630 of actuating the rail lock actuator 168, wherein actuating the rail lock actuator 168 releases the arm pad 140 from a locked position relative to the armrest subframe 132, wherein the arm pad 140 is laterally aligned with and translatably coupled to the armrest subframe 132. For example, the user may push a button associated with the rail lock actuator 168, releasing the arm pad 140 from a locked translated position relative to the armrest subframe 132. The rail lock activator 168 may be configured such that deactivating the rail lock actuator (e.g., by releasing the button associated with the rail lock actuator 168) relocks the arm pad 140 into a locked position relative to the rail subframe 132. In some embodiments, the arm pad 140 may be translated relative to the arm subframe 132 via a biasing member, such as a spring.

In some embodiments, the method 600 includes a step 640 of manually rotating the armrest frame 104 relative to the seat frame 104 and deactivating the rotation input actuator 172. For example, while pressing the button associated with the rotation input actuator 172, the user may press down in the arm pad 140 (e.g., countering the biasing action of the rotation mechanism) and adjust the rotation of the armrest 120 to the desired position. Upon deactivation of the rotation input actuator 172 (e.g., by releasing the button associated with the rotation input actuator 172), the armrest 120 relocks into a rotation position.

In some embodiments, the method includes a step 650 of manually pivoting the armrest subframe 132 relative to the armrest frame 124 and deactivating the tilt input actuator 164. For example, while pressing the button associated with the tilt input actuator 164, the user may press down on the arm pad 140 (e.g., countering the biasing action of the tilting mechanism) and adjust the tilt of the arm pad 140 to the desired position. Upon deactivation of the tilt input actuator 164 (e.g., by releasing the button associated with the tilt input actuator 164), the armrest subframe 132 relocks into a tilt position.

In some embodiments, the method includes a step 660 of manually translating the arm pad relative to the armrest subframe, and deactivating the rail lock actuator. For example, while pressing the button associated with the rail lock actuator 168, the user may lightly press down on the arm pad 140 and push the arm pad 140 to extend or retract relative to the armrest subframe 132 to the desired position. Upon deactivation of the rail lock actuator (e.g., by release the button associated with the rail lock actuator 168), the arm pad 140 locks into a translate position relative to the armrest subframe. Through the rotational, pivotal/tilting and extension/retraction movements provided by the armrest 120, the arm pad 140 may be placed into any one of an unlimited number of rotation, pivot/tilt and extension/retraction positions, enabling the user to comfortably rest their arm.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An armrest, comprising:
    an armrest frame rotationally coupled at a first end to a seat frame;
    an armrest subframe pivotably coupled to a second end of the armrest frame;
    an arm pad laterally aligned and translatably coupled to the armrest subframe comprising a structure layer, wherein the structure layer comprises a rail;
    a tilting mechanism configured to pivot the armrest subframe relative to the armrest frame, comprising:
        a first moveable member pivotally coupled to the armrest subframe,
        a second moveable member pivotally coupled to the armrest frame and mechanically coupled to the first moveable member;
        a pushrod coupled the first moveable member and the second moveable member at a pivot end, and at least one of the armrest frame or armrest subframe, wherein an extension of the pushrod increases the tilt of the armrest subframe relative to the armrest frame; and
        a tilt mechanism spring mechanically coupled to at least one of the first moveable member, the second moveable member, or the pushrod and configured to bias the pushrod towards the extension comprising a tilt input activator configured to release the tilting mechanism from a locked position by pressing a first push button;
    a translation mechanism configured to translate the arm pad relative to the armrest subframe comprising:
        a rail lock actuator coupled to the armrest frame and configured to releasably interact with the rail, comprising a spring-loaded biasing unit coupled to the armrest subframe that biases against the rail, securing the rail into a locked position, wherein the spring-loaded biasing unit is unlocked from the locked position by pressing a second push button; and
    a rotation mechanism coupled to the seat frame and the armrest, and configured to rotate the armrest relative to the seat frame, wherein the rotation mechanism comprises a spring-loaded linkage, wherein the rotation mechanism includes a rotation input activator configured to unlock a locked position of the rotation mechanism by pressing a third push button, wherein the first press button, the second press button, and the third press button are located on a same side of the armrest frame and arranged in a same plane.

2. The armrest of claim 1, wherein the pushrod is configured to releasably lock at more than one position of extension.

3. The armrest of claim 1, wherein the tilting mechanism is configured to lock the armrest subframe into a plurality of tilting positions relative to the armrest frame.

4. The armrest of claim 1, wherein the armrest is configured to manually pivot relative to the armrest frame.

5. The armrest of claim 1, wherein the rail lock actuator is configured as a friction lock.

6. The armrest of claim 1, wherein the rail lock actuator is configured to lock the arm pad into a plurality of translation positions relative to the armrest subframe.

7. The armrest of claim 1, wherein the arm pad is configured to translate manually relative to the armrest subframe.

8. The armrest of claim 1, wherein the rotation mechanism is configured to releasably lock into a plurality of rotation positions relative to the seat frame.

9. The armrest of claims 1, wherein the armrest is configured to be manually pivoted relative to the armrest frame.

10. A method for adjusting an armrest comprising:
    actuating a tilt input actuator via a first press button, wherein actuating the tilt input actuator releases a tilting mechanism from a locked tilted position, wherein a release of the tilting mechanism pivotably biases an armrest subframe relative to the armrest frame, wherein the armrest subframe and the armrest frame are pivotably coupled;
    actuating a rail lock actuator via a second press button, wherein actuating the rail lock actuator releases an arm pad from a locked position relative to the armrest subframe, wherein the arm pad is laterally aligned and translatably coupled to the armrest subframe; and
    actuating a rotation input actuator via a third press button, wherein actuating the rotation input actuator releases a rotation mechanism from a locked rotation position, wherein a release of the rotation mechanism rotationally biases an armrest frame relative to a seat frame, wherein the armrest frame and the seat frame are rotationally coupled, wherein the first press button, the second press button, and the third press button are located on a same side of the armrest frame and arranged in a same plane.

11. The method of claim 10 further comprising manually rotating the armrest frame relative to the seat frame and deactivating the rotation input actuator.

12. The method of claim 10 further comprising manually pivoting the armrest subframe relative to the armrest frame and deactivating the tilt input actuator.

13. The method of claim 10, further comprising manually translating the arm pad relative to the armrest subframe, and deactivating the rail lock actuator.

* * * * *